United States Patent [19]

Mogi et al.

[11] Patent Number: 5,764,764
[45] Date of Patent: Jun. 9, 1998

[54] VIDEO SIGNAL FORMAT CONVERTING CIRCUIT

[75] Inventors: Yasuhide Mogi, Kanagawa; Etsuro Yamauchi, Tokyo; Atsushi Narita, Kanagawa, all of Japan

[73] Assignee: Sony Corporation, Tokyo, Japan

[21] Appl. No.: 835,272

[22] Filed: Apr. 8, 1997

Related U.S. Application Data

[62] Division of Ser. No. 545,033, Oct. 19, 1995, Pat. No. 5,657,387.

[30] Foreign Application Priority Data

Oct. 25, 1994 [JP] Japan .................................. 6-284043

[51] Int. Cl.[6] ............................................ H04N 7/167
[52] U.S. Cl. ................................................ 380/20; 380/5
[58] Field of Search ...................................... 380/5, 20, 16, 380/15, 10

[56] References Cited

U.S. PATENT DOCUMENTS

| | | | |
|---|---|---|---|
| 4,642,688 | 2/1987 | Lowry et al. ................... | 380/20 |
| 4,691,352 | 9/1987 | Arragon et al. ................ | 380/20 |
| 5,553,140 | 9/1996 | Kubota et al. ................. | 380/10 |
| 5,657,387 | 8/1997 | Mogi et al. .................... | 380/20 |

*Primary Examiner*—David C. Cain
*Attorney, Agent, or Firm*—Frommer Lawrence & Haug LLP; William S. Frommer

[57] ABSTRACT

A video signal format converting circuit is disclosed, comprising a signal converting matrix circuit and a filter circuit that is constructed of a time delaying device for a video signal corresponding to a standard television format. When a digital video signal corresponding to a first video signal format is converted into a second video signal format that is different from the first video signal format and then output, the time delaying device of the filter circuit is used as a delaying circuit. The output signal of the delaying circuit or the video signal corresponding to the standard television signal format is selectively output. While or after the video signal corresponding to the first video signal format is converted into the video signal corresponding to the second signal format, the video signal is modified so as to protect it from being copied.

5 Claims, 8 Drawing Sheets

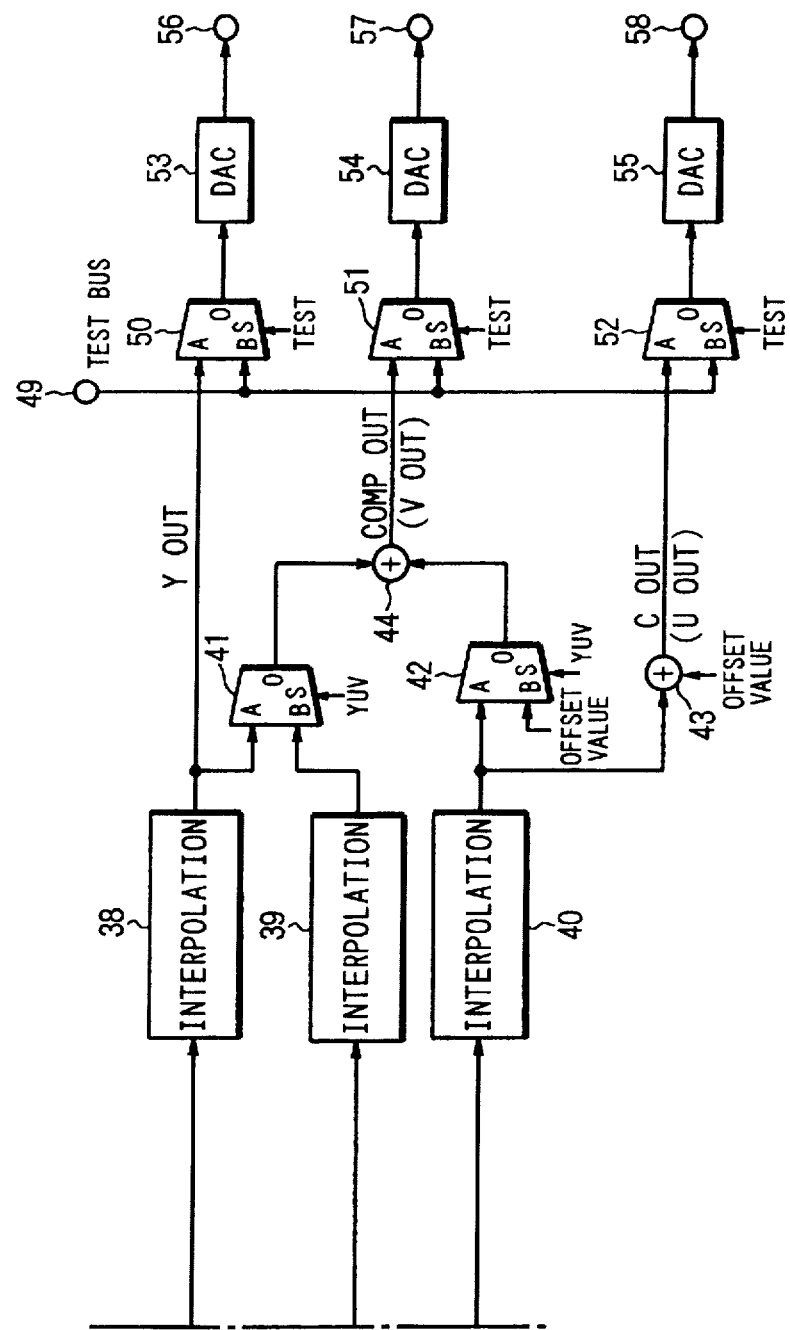

VIDEO SIGNAL FORMAT CONVERTING CIRCUIT

This application is a division of application Ser. No. 08/545,033, filed Oct. 19, 1995 U.S. Pat. No. 5,657,387.

BACKGROUND OF THE INVENTION

1. Field of the Invention

The present invention relates to a video signal format converting circuit for generating a video signal of a video signal format other than a composite video signal from a digital video signal that is reproduced from a digital VCR, received by a digital satellite broadcasting television receiver or a digital cable television receiver, or the like and for modifying the video signal so as to protect it from being copied.

2. Description of the Related Art

In recent years, as digital signal processing technologies have advanced, digitization of video signals has been actively employed for digital VCRs and digital satellite broadcasting receivers. In addition to digital video apparatuses that handle composite video signals, other digital video apparatuses that handle so-called S terminal output signals, or a luminance signal and color difference signals (YUV signals), or RGB signals have been placed in the market so as to improve image quality of programs.

On the other hand, since apparatuses as represented by VCRs that record and reproduce video signals have been widely used, copy protecting methods such as video signal modifying method by Macro Vision Company (U.S. Pat. Nos. 4,631,603, 4,577,216, 4,819,098, and 5,315,448) have been employed from a point of view of copyright protection for visual software packages. In a conventional analog VCR, a particular signal that causes the operation of the AGC circuit of a recording VCR that dubs video signals of a movie video tape to malfunction is placed in vertical blanking intervals of the video signals. The resultant video signals are output from the VCR. However, in the digital VCR and digital broadcasting television receiver, information in the vertical blanking intervals is not recorded and broadcast so as to reduce the data amount. In these apparatuses, when reproduced or received digital video signals are converted into standard television signals such as NTSC television signals, a synchronous signal or the like is added thereto. Thus, the signal that causes the operation of the AGC circuit of the above-descried recording VCR to malfunction is added along with the synchronous signal or the like.

Thus, it is necessary to convert a received digital video signal into a signal format corresponding to other than the composite signal format so as to handle digital video apparatuses such as high image quality digital VCRs and digital broadcasting television receivers. In addition, when output signals other than the composite signals are not protected by a copyright law, it is improper from a view point of the protection of intellectual property rights. Consequently, it is necessary to modify video signals corresponding to other than the composite signals so as to protect them from being copied.

OBJECTS AND SUMMARY OF THE INVENTION

An object of the present invention is to solve such a problem and provide a video signal converting circuit for converting a received digital video signal into a video signal corresponding to a composite video signal and a video signal corresponding to other than the composite video signal and modifying a video signal corresponding to any video signal output format so as to protect the signal from being copied.

To accomplish the above-described object, the present invention is a video signal format converting circuit, comprising a means for converting a digital video signal into a first video signal corresponding to an analog composite output format and a second video signal corresponding to other than the analog composite output format and a means for modifying the first video signal and the second video signal so as to protect these signals from being analogously copied.

Thus, a digital video signal is converted into a composite video signal and another video signal corresponding to a high image quality system. In addition, the resultant video signal can be modified so as to protect it from being copied.

The above, and other, objects, features and advantage of the present invention will become readily apparent from the following detailed description thereof which is to be read in connection with the accompanying drawings.

BRIEF DESCRIPTION OF THE DRAWINGS

FIGS. 1A, 1B and 1C are block diagrams showing a signal format converting circuit according to a first embodiment of the present invention;

DETAILED DESCRIPTION OF THE PREFERRED EMBODIMENTS

Next, with reference to the accompanying drawings, embodiments of the present invention will be described. In the following description, digital video signals for digital video apparatuses such as digital VCRs and digital broadcasting receivers are converted into a luminance signal (Y) and a color signal (C), or a luminance signal (Y) and color difference signals (U and V), or RGB signals that are different from composite video signals and then generated. As a method for protecting these video signals from being copied, the modification of video signals corresponding to the Macro Vision method is exemplified. More specifically, the present invention will be explained based on a digital video signal stream corresponding to CCIR-601 (ITU-R601).

Figure 1A:
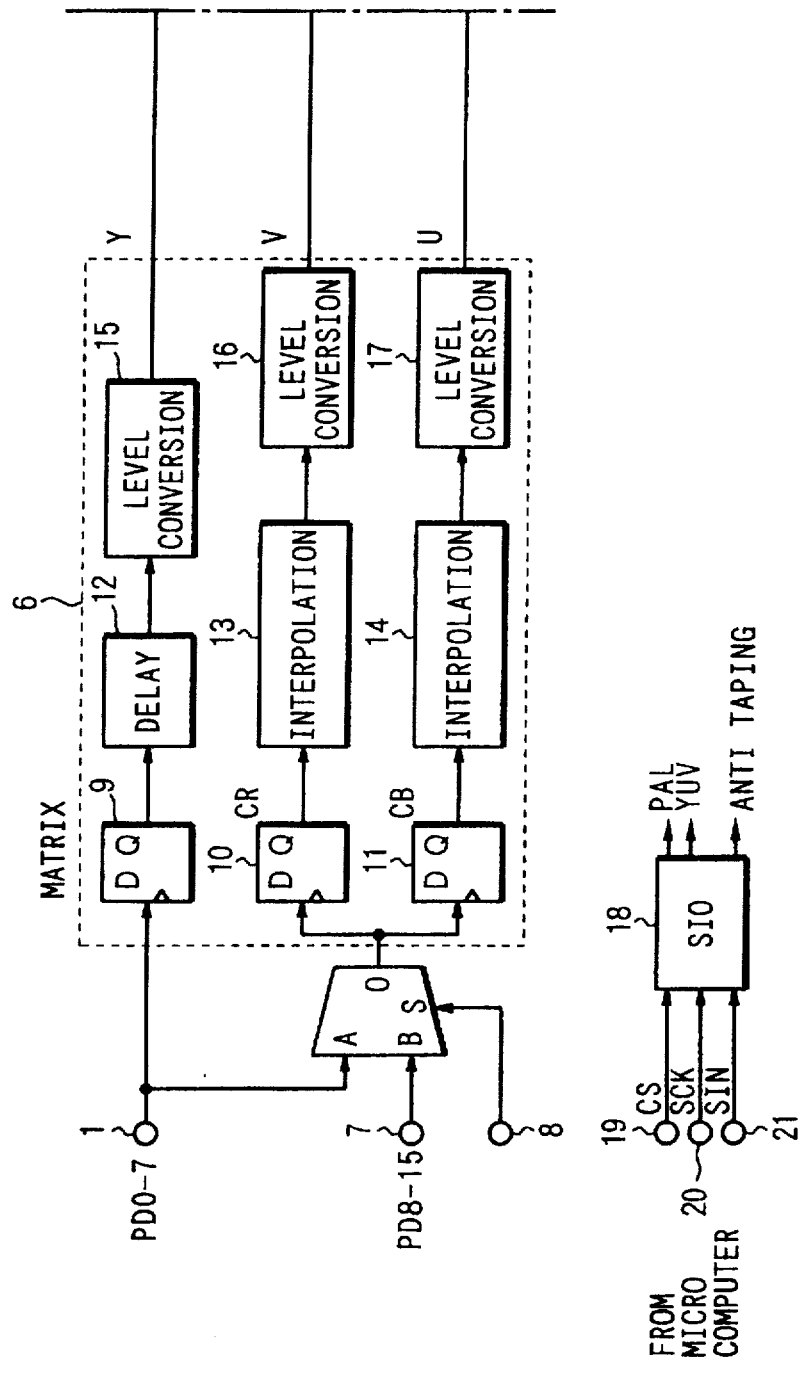
Figure 1B:
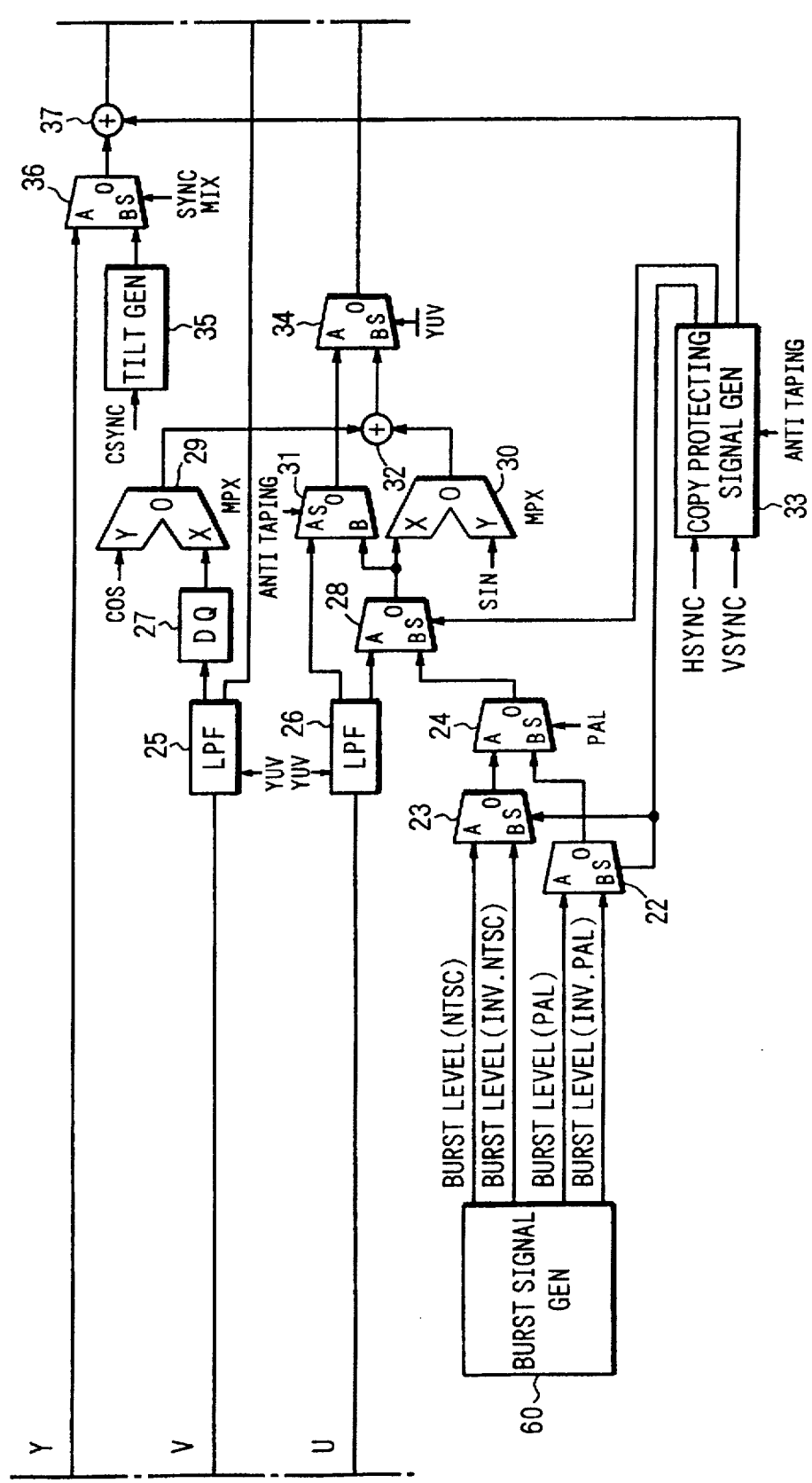
Figure 2:
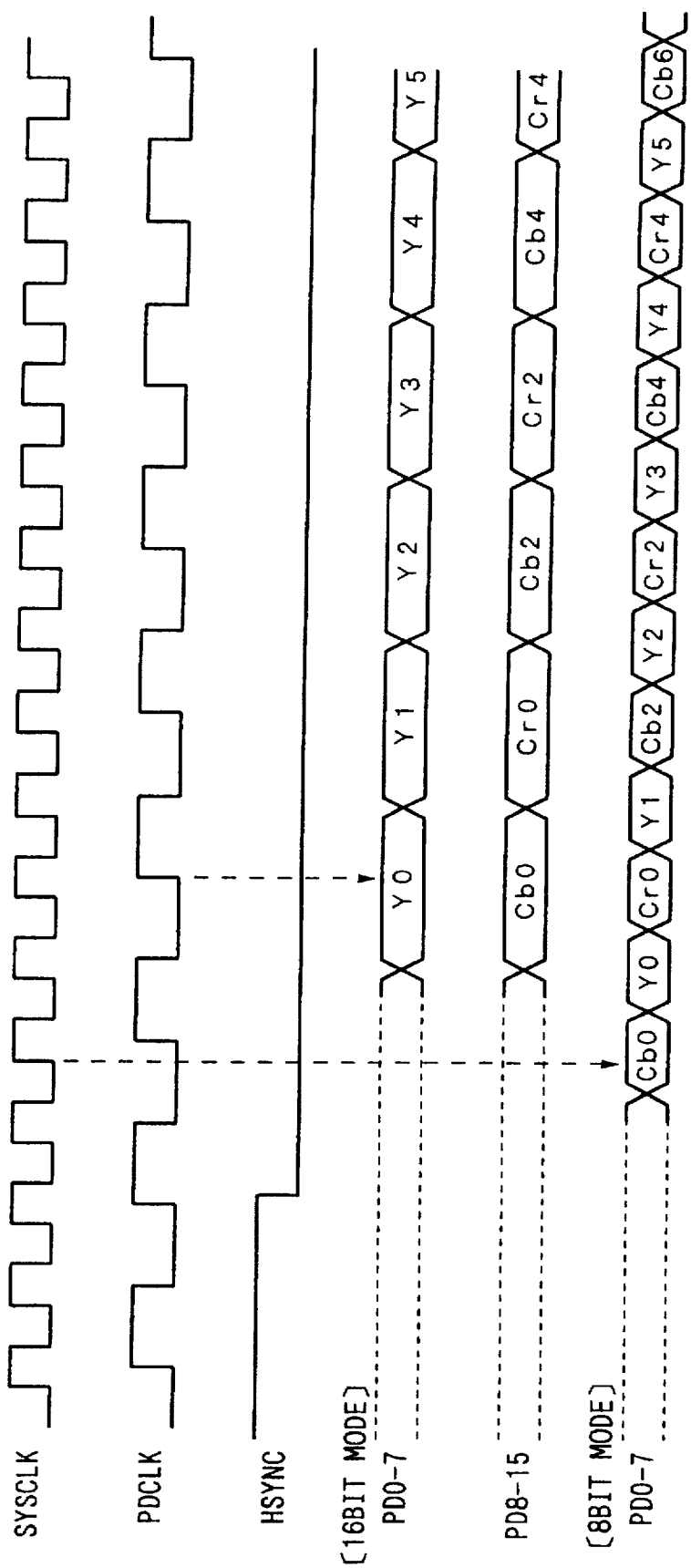
FIG. 2 is a schematic diagram showing input signals of the apparatus according to first embodiment of the present invention.

FIGS. 1A, 1B and 1C are circuit diagrams showing the construction of a video signal converting circuit according to a first embodiment of the present invention. The video signal converting circuit has two selectable modes that are a first mode for outputting a composite signal, a luminance signal (Y), and a color signal (C) and a second mode for outputting a luminance signal (Y) and color difference signals (U and V). In Figs. 1A, 1B and 1C, reference numerals 1, 2, 3, 7, 8, 19, 20, 21, and 49 are signal input terminals. Reference numeral 4 is a clock generating circuit. Reference numeral 5 is a synchronous signal generating circuit. Reference numeral 6 is a matrix circuit. Reference numerals 9, 10, 11, and 27 are latch circuits. Reference numerals 13, 14, 38, 39, and 40 are signal interpolating circuits. Reference numerals 15, 16, and 17 are signal level converting circuits. Reference numeral 18 is a serial signal circuit that receives a command from a microcomputer (not shown). Reference numerals 22, 23, 24, 28, 31, 34, 36, 41, 42, 50, 51, and 52 are selectors. When the value of a selection signal S is "1", an input B is supplied to an output O. When the value of the selection signal S is "0", an input A is supplied to the output 0. Reference numerals 25 and 26 are filter circuits that are constructed of a plurality of time delaying devices or the like. Reference numerals 29 and 30 are multiplier circuits. Reference numerals 32, 37, 43, and 44 are adder circuits. Reference numeral 33 is a copy protection signal generating circuit that generates a signal for modifying a video signal so as to protect it from being copied. Reference numeral 35 is a synchronous signal tilt generating circuit. Reference numerals 53, 54, and 55 are DA converting circuits. Reference numerals 56, 57, and 58 are output circuits. Reference numeral 60 is a burst signal generating circuit. FIG. 2 is a schematic diagram showing signal waveforms of a digital video signal stream (corresponding to the CCIR-601 (ITU-601) standard) that is supplied to the input terminal 1 or 7.

Next, the operation of the first mode will be described. In FIGS. 1A, 1B and 1C, a clock signal that is a reference signal of the system is supplied from the input terminal 2. A reset signal that initializes the system state is supplied from the input terminal 3. The clock signal generating circuit 4 supplies the clock signal and the reset signal to each portion (not shown) of the system. The microcomputer (not shown) outputs a mode designation signal and so forth to the serial signal circuit through the input terminals 19, 20, and 21 so as to designate the mode of each portion of the system (only a part of the system is shown). Signals PDO-15 (in the case of the 16-bit mode) or signals PDO-7 (in the case of the eight-bit mode) shown in FIG. 2 are supplied from the input terminal 1 or 7. FIG. 2 shows both the cases of the eight-bit mode and the 16-bit mode of the digital video signal stream received from the preceding stages of the input terminals 1 and 7. The selected signal(s) is supplied to the matrix circuit 6.

In the matrix circuit 6, the latch circuits 9, 10, and 11 separate signals Y, Cb, and Cr from the time series stream, respectively. The output signals of the latch circuits 10 and 11 are interpolated by the signal interpolating circuits 13 and 14 so that the number of pixels of the output signals of the latch circuits 10 and 11 accords with that of the luminance signal Y. The luminance signal Y is delayed by the delaying circuit 12 for a predetermined time period so as to compensate the signal delays in the signal interpolating circuits 13 and 14. The levels of the output signals of the delaying circuit 12 and the signal compensating circuits 13 and 14 are converted into levels suitable for signal processes by the signal level converting circuits 15, 16, and 17. In addition, the output signals of the delaying circuit 12 and the signal compensating circuits 13 and 14 are multiplied by predetermined coefficients and thereby these signals are converted into YUV signals (luminance signal and color difference signals). The output signals U and V of the signal level converting circuits 16 and 17 are supplied to the filter circuits 25 and 26 so as to limit the frequency bands of the signals, respectively.

In the copy protecting method of the video signal modifying method by Micro Vision Company, a pulse that exceeds the level of a video signal or that varies in the range equivalent to the pedestal level is applied to the luminance signal so as to cause the operation of the AGC circuit of the video signal recording/reproducing apparatus to malfunction. In addition, the phase of a chrominance subcarrier that is a reference of a color signal process is inverted in a plurality of predetermined horizontal synchronous signal intervals so as to cause the color signal processing circuit of the video signal recording/reproducing apparatus to malfunction.

Corresponding to the video signal modifying method, the burst signal generating circuit 60 generates a burst signal having an inverted phase only in a plurality of predetermined horizontal synchronous signal intervals. The burst signal generating circuit 60 generates. In addition, the burst signal generating circuit 60 generates inverted phase burst signals and normal phase burst signals corresponding to the NTSC format and the PAL format. Corresponding to a control signal received from the copy protection signal generating circuit 33, the selectors 22, 23, 24, and 28 are controlled so as to supply the inverted burst signal to the selector 28. The selector 28 adds the inverted burst signal to the U signal so as to modify the U signal. The delay of the modified U signal is applied to the V signal by the latch circuit 27. The output signals of the latch circuit 27 and the selector 28 are multiplied by a cosine wave signal cos and a sine wave signal sin received from the chrominance subcarrier generating circuit (not shown) by the multiplier circuits 29 and 30, respectively. The resultant signals are added by the adder circuit 32 so that the luminance signal is converted into a color signal (C). The resultant signal is output to the signal interpolating circuit 40 through the selector 34. The selectors 34, 41, and 42 are controlled corresponding to a control signal YUV received from the serial signal circuit 18. When the value of the control signal YUV is "0", the selectors 34, 41, and 42 output a signal on the side A. When the value of the control signal YUV is "1", the selectors 34, 41, and 42 output a signal on the side B. In the first mode, the value of the control signal YUV is "0".

A synchronous signal is added to the luminance signal Y by the synchronous signal tilt generating circuit 35 and the selector 36. The synchronous signal tilt generating circuit 35 generates a synchronous signal with an analogous tilt to a digital synchronous signal (CSYNC) generated by the synchronous signal generating circuit 5. The copy protection signal generating circuit 38 generates a pulse that exceeds the level of the video signal or that vary in the range equivalent to a pedestal level corresponding to the video signal modifying method of Macro Vision Company. The adder circuit 33 adds the pulse to the synchronous signal that is output from the selector 36. Thus, the video signal (luminance signal and color signal) is modified with the copy protection signal corresponding to the video signal modifying method of Macro Vision Company. The selector 31 and the copy protection signal generating circuit 33 are controlled corresponding to a control signal (anti taping) that is output from the serial signal circuit 18 that receives a command from the microcomputer (not shown). Thus, the addition of the copy protection signal can be enabled or disabled. In the case of the digital VCR, the copyright information recorded on the magnetic tape is reproduced and supplied to the microcomputer (not shown). The microcomputer commands the serial signal circuit 18 to generate the control signal (anti taping). When the copyright information recorded on the magnetic tape represents that the program has been protected by the copyright law, the control signal (anti taping) causes the selector 31 to output the signal on the side B. In addition, the control signal causes the copy protection signal generating circuit 33 to generate a pulse signal. The adder circuit 37 adds the pulse signal to the luminance signal (Y). On the other hand, when the copyright information recorded on the magnetic tape represents that the program has not been protected by the copyright law, the control signal (anti taping) causes the selector 31 to output the signal on the side A and prohibits the copy protection signal generating circuit 33 from generating the pulse signal. In the case of the digital satellite broadcasting television receiver, the copyright information is received along with the digital video signal. The copyright information is supplied to the microcomputer (not shown). The microcomputer commands the serial signal circuit 18 to generate the control signal (anti taping). The operation corresponding to the copyright information of the digital satellite broadcasting television receiver is the same as that of the digital VCR.

After the pixels of the luminance signal (Y) and the color signal (C) that have been processed in the above-described manner are interpolated by the signal interpolating circuits 38 and 40, the resultant luminance signal (Y) is converted into an analog signal by the DA converting circuit 53 through the selector 50 and then output from the output terminal 56. An offset value is added to the resultant color signal (C) by the adder circuit 43. The resultant signal is converted into an analog signal by the DA converting circuit 55 through the selector 52 and then output from the output terminal 58. The resultant luminance signal (Y) and color signal (C) are supplied to the adder circuit 44 through the selectors 41 and 42, respectively. The output signal of the adder circuit 44 is a composite signal. The composite signal is supplied to the DA converting circuit 54 through the selector 51. After the composite signal is converted into an analog signal by the DA converting circuit 54, the analog signal is output from the output terminal 57. The selectors 50, 51, and 52 select test signal inputs of the DA converting circuits 53, 54, and 55. Normally, the input A is selected. Thus, not only the composite signal that has been copy protected, but the luminance signal (Y) and the color signal (C) that have been copy protected can be output.

Next, the operation of the second mode for outputting the YUV signals (luminance signal and color difference signals) will be described. In FIGS. 1A, 1B and 1C, a clock signal that is a reference signal of the system is received from the input terminal 2. A reset signal that initializes the system state is received from the input terminal 3. The clock signal generating circuit 4 supplies the clock signal and the reset signal to each portion (not shown) of the system. The microcomputer (not shown) supplies a mode designation signal and so forth to the serial signal circuit through the input terminals 19, 20, and 21 so as to designate the mode of each portion of the system (only a part of the system is shown). Unlike with the first mode for outputting the composite signal, the luminance signal (Y), and the color signal (C), in this operation, however, the value of a control signal YUV that is supplied to the filter circuit 25 and 26 and the selectors 34, 41, and 42 is set to "1" so as to output a YUV signal. The signals shown in FIG. 2 are received from the input terminal 1 or 7. The eight-bit mode or the 16-bit mode shown in FIG. 2 is selected corresponding to the signal that is received from the. input terminal 8. The selected signal is supplied to the matrix circuit 6.

In the matrix circuit 6, the latch circuits 9, 10, and 11 separate signals Y, Cb, and Cr from a time series signal. The output signals of the latch circuits 10 and 11 are interpolated by the signal interpolating circuits 13 and 14 so that the number of pixels of these signals accords with that of the luminance signal. The luminance signal Y is delayed by the delaying circuit 12 for a predetermined time period so as to compensate the time delays of the signals in the signal interpolating circuits 13 and 14. The levels of the output signals of the delaying circuit 12 and the signal interpolating circuits 13 and 14 are converted into levels of signals suitable for signal processes by the signal level converting circuit. In addition, the output signals of the delaying circuit 12 and the signal interpolating circuits 13 and 14 are multiplied by predetermined coefficients and thereby these signals are converted into YUV signals.

When the YUV signals are output, the video signal cannot be modified corresponding to the copy protection signal. In addition, since the later signal process for the luminance signal is different from that for the color difference signals, the time matching of the luminance signal and the color difference signals is lost. To solve such a problem, according to the present invention, the Y signal and the U signal are modified so as to prevent the video signal from being copied. In addition, using the time delaying devices of the filter circuits 25 and 26 that are not used when the YUV signals are output, the time matching of the luminance signal and the color difference signals is maintained.

Figure 3:
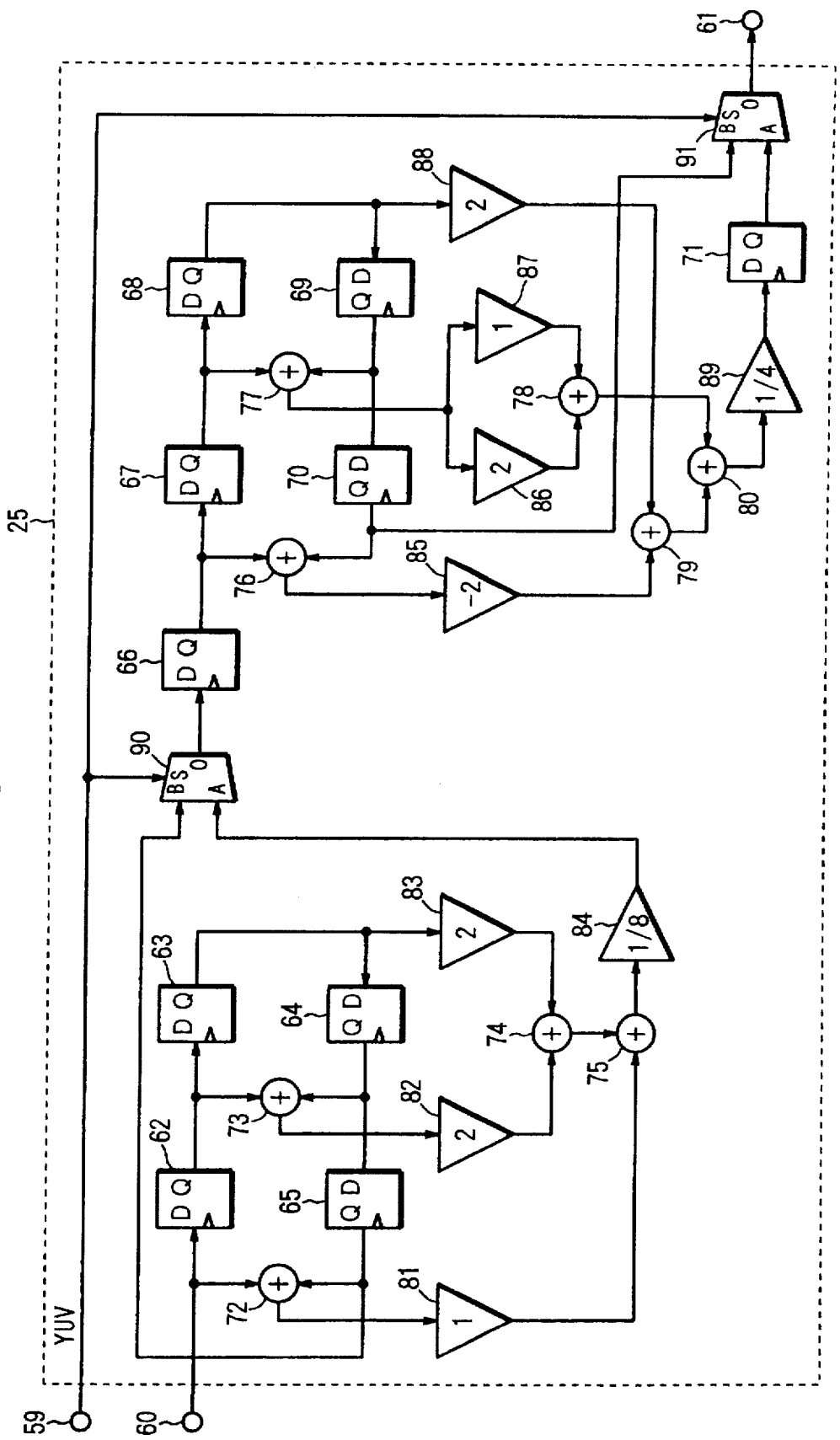
FIG. 3 is a block diagram showing an example of the construction of a filter circuit constructed of a plurality of time delaying devices according to the present invention.

FIG. 3 is a circuit diagram showing an example of the construction of the filter circuit 25 constructed of a plurality of time delaying devices. Likewise, the filter circuit 26 can be accomplished by a construction similar to that shown in FIG. 3. Since the filter circuit is a typical example of a digital filter, only the operation relating to the present invention will be described. Thus, the operation as the filter circuit will be omitted. In FIG. 3, reference numeral 59 and 60 are input terminals. Reference numeral 61 is an output terminal. Reference numerals 62, 63, 64, 65, 66, 67, 68, 69, 70, and 71 are time delaying devices. Reference numerals 72, 73, 74, 75, 76, 77, 78, 79, and 80 are adder circuits. Reference numerals 81, 82, 83, 84, 85, 86, 87, 88, and 89 are coefficient devices. Reference numerals 90 and 91 are selectors.

Since a signal that is received from the input terminal passes through the time delaying device 62 and so forth, the signal is delayed. When the composite signal, the luminance signal (Y), and the color signal (C) are output, the delayed signals are multiplied by a coefficient and they are added so as to accomplish a desired filter characteristic. However, when the YUV signals are output, these time delaying devices are used as a delaying circuit. Thus, a level signal with a value of "1" is supplied to the input terminal 59 and the selectors 90 and 91 are placed in the position B so as to connect the time delaying devices in series. This operation is clear from FIG. 3. In this embodiment, in the filter circuit using for example 10 time delaying devices, nine time delaying devices are connected in series. However, the present invention is not limited to such a construction. In other words, to accomplish the desired characteristic for the standard television signal, the number of the time delaying devices is not limited to ten. In addition, the number of the time delaying devices that are connected in series is not limited to nine. Instead, as long as the number of the time delaying devices does not exceed that for the standard television signal, the number of the time delaying devices is not limited. In the construction according to the present invention, the difference of time delay amounts in the later stages can be absorbed.

Returning to FIGS. 1A, 1B and 1C, the YUV signals obtained by the matrix circuit 6 are supplied to the filter circuits 25 and 26 that compensate the time delays. The filter circuits 25 and 26 delay the YUV signals so as to absorb time delay amounts in the later stages. The output signals of the filter circuits 26 are supplied to the signal interpolating circuit and the selector 31 that selects a signal that has been modified for protecting the video signal from being copied. When the video signal is not modified, the output signal of the filter circuit 26 is directly output to the selector 31. When the video signal is modified for protecting it from being copied, the output signal is obtained through the filter circuit 26 and the selector 28. The output signal of the selector 31 is supplied to the selector 34. The output signal of the selector 34 is supplied to the signal interpolating circuit 40. Since the process for the luminance signal is the same as that for the first mode for outputting the composite signal, the luminance signal (Y), and the color signal (C), the description will be omitted.

The signal that has been interpolated by the signal interpolating circuit 39 is selected by the selector 41. The offset value is selected by the selector 42. The output signal of the selector 41 and the output signal of the selector 42 are added by the adder circuit 44. The output signal of the adder circuit 44 is supplied to the DA converting circuit 54 through the selector 51. An analog signal that is the output signal of the DA converting circuit 54 is output as a V output from the output terminal 57. The output signal of the signal interpolating circuit 40 is added to the offset value by the adder circuit 43. The output signal of the adder circuit 43 is supplied as an analog signal to the DA converting circuit 55 through the selector 52. The analog signal is output from the output terminal 58.

Next, the difference of time delay amounts of the luminance signal and the color difference signals will be described in brief. As is clear from FIGS. 1A, 1B and 1C, the difference of the processes for the luminance signal and the color difference signals is whether or not the signals pass through selectors or adder circuits. The time delay amount of each constructional element is in the range from several clock pulses to twenty clock pulses. On the other hand, the characteristic of the filter circuit for the standard television signal directly affects the image quality. Thus, more time delaying devices than those for the difference of the time delay amounts of the luminance signal and the color difference signals are required.

As described above, according to the present invention, the YUV signals that are different from composite signals can be output from digital video signals without need to add any time delaying devices. In addition, any video signals can be modified so as to protect them from being copied. The above-described first mode or second mode can be selected corresponding to the type of the digital video apparatus (for example, a digital VCR, a digital satellite broadcasting television receiver, and so forth). Thus, in the same system, these modes cannot be manually selected. This applies to the second embodiment of the present invention.

Figure 4A:
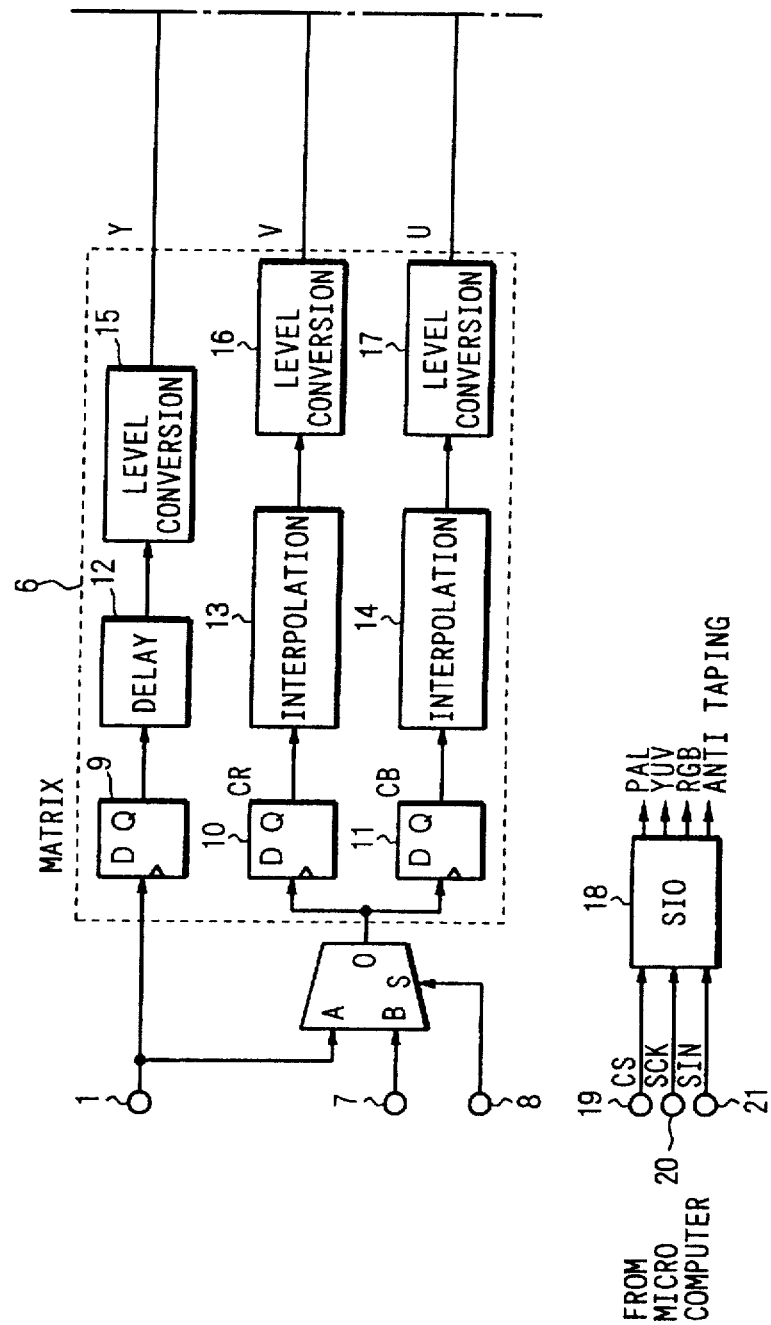
FIGS. 4A, 4B and 4C are block diagrams showing a signal format converting circuit according to a second embodiment of the present invention.
Figure 4B:
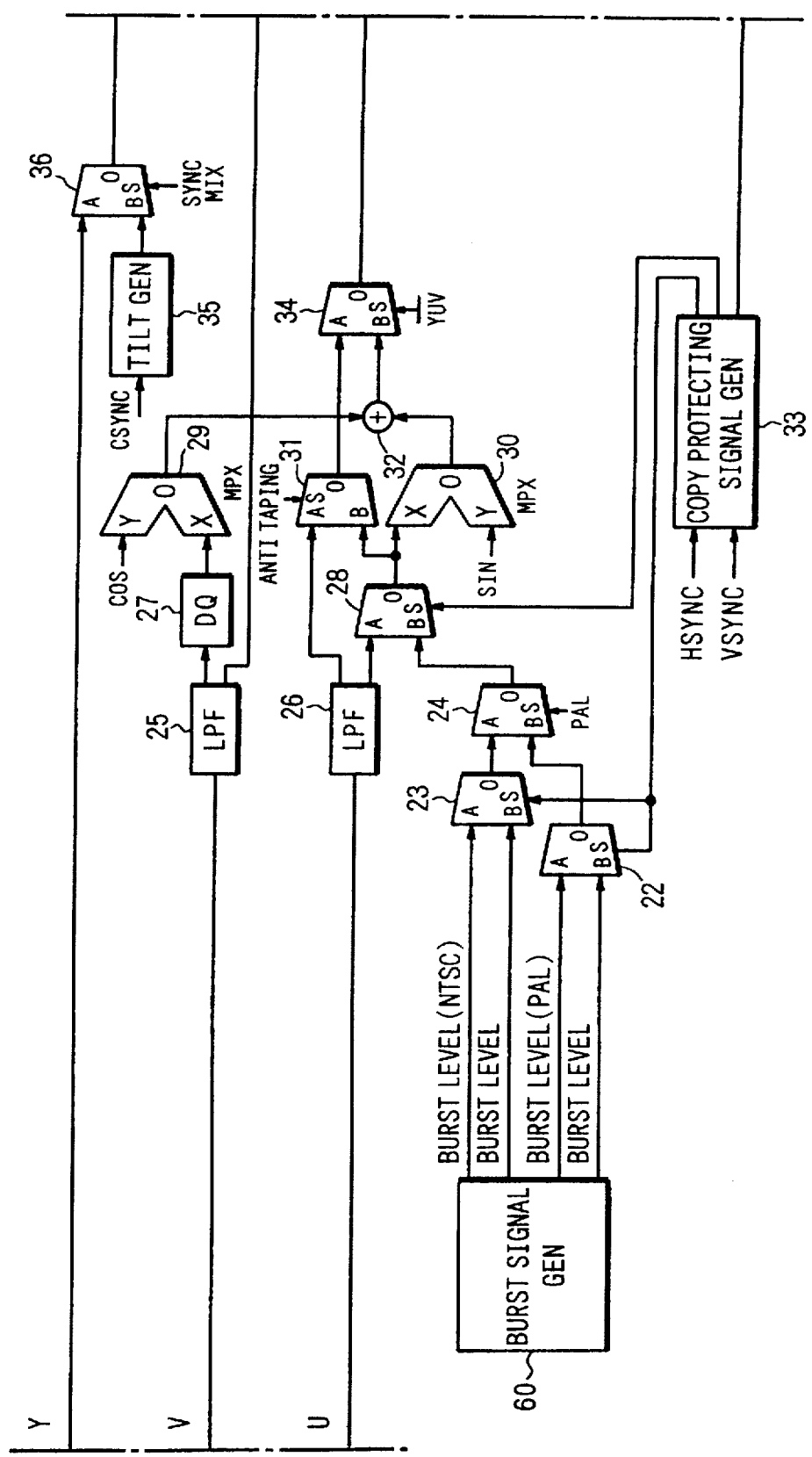
Figure 4C:
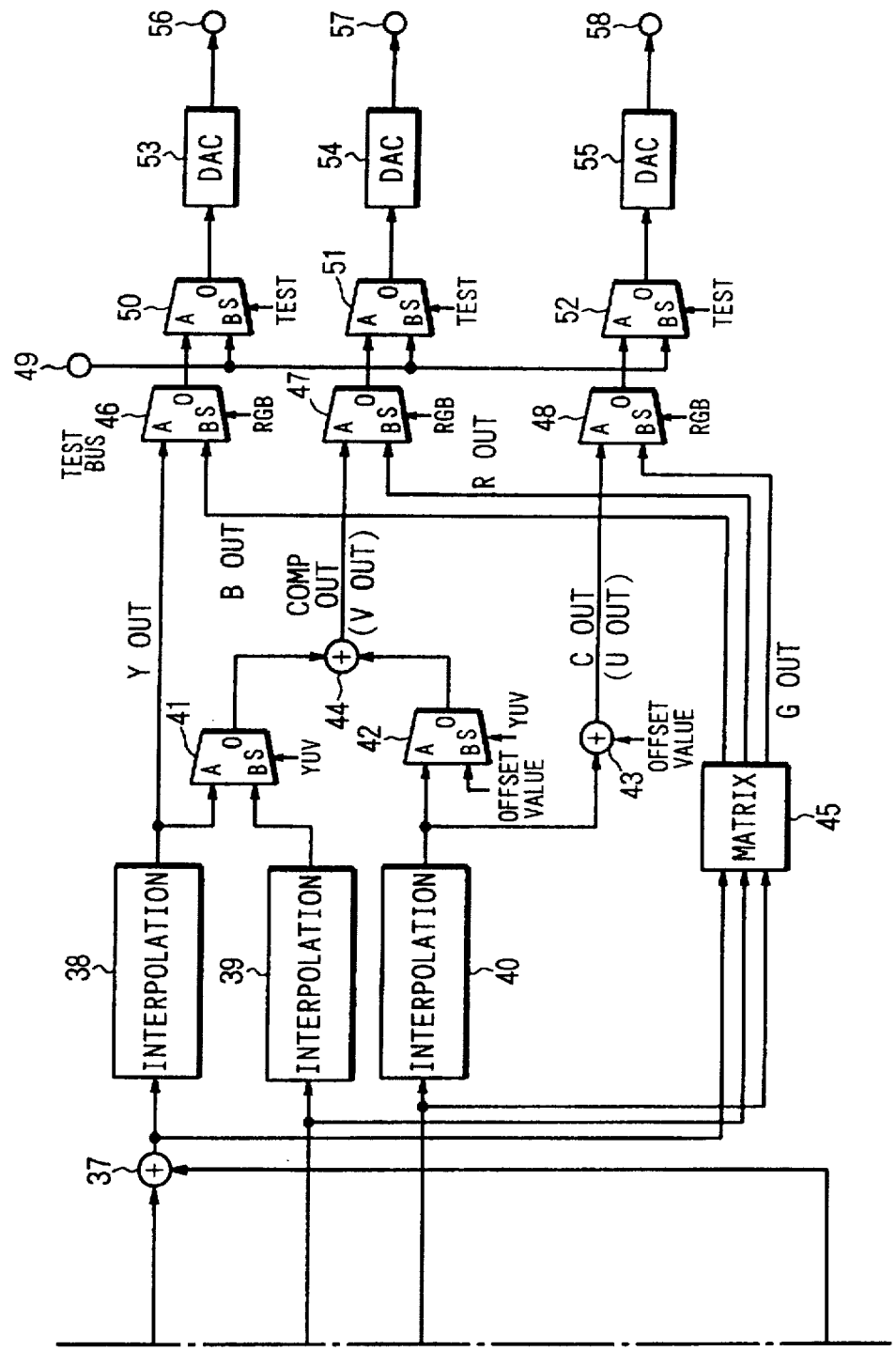

Next, with reference to FIGS. 4A, 4B and 4C, a second embodiment of the present invention will be described. In the second embodiment, as with the first embodiment, the first mode for outputting the composite signal, the luminance signal (Y), and the color difference signal (C) or the second mode for outputting the YUV signals can be selected from the digital video signal stream corresponding to the CCIR-601 (ITU-R601) standard. In addition, a third mode for outputting the RGB signals can be also selected.

In the third mode unlike with the first embodiment, a second matrix circuit 45 generates the RGB signals. The RGB signals are modified so as to protect them from being copied. Since the method for generating the RGB signals from the YUV signals is known, the description thereof will be omitted. In the third mode, selectors 46, 47, and 48 are placed in a position B corresponding to a selection control signal RGB that is output from a microcomputer 18. Signals B, R, and G are output to output terminals 56, 57, and 58 through selectors 50, 51, and 52 and DA converting circuits 53, 54, and 55, respectively.

As described above, according to the present invention, the RGB signals as output signals can be output from the digital video signals without need to add any time delaying devices. In addition, the video signals can be modified so as to protect them from being copied.

In the above-described embodiments, the digital video signals are converted into the NTSC analog signals. As the method for protecting signals from being copied, the Macro Vision method is used. However, it should be noted that the present invention is not limited to such a system. Instead, the video signal formats of the above-described embodiments can be changed. Moreover, in the above-described embodiments, the Macro Vision method was exemplified as a video signal modifying method for protecting signals from being copied. However, the present invention is not limited to such a method. Thus, even if another video signal modifying method is used, the effects of the present invention are not deteriorated.

According to the present invention, digital video signals are converted into video signals other than composite video signals. Video signals other than the composite video signals can be modified so as to protect them from being copied.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claim is:

1. A digital reproducing apparatus for reproducing a recorded digital video signal from a recording medium as an analog video signal and outputting the analog video signal, comprising:

reproducing means for reproducing the recorded digital video signal and copyright information which is recorded along with the digital video signal, said copyright information selectively indicating whether the reproduced digital video signal is copy-protected, video signal processing means for processing the reproduced digital video signal and outputting a digital luminance signal, a first digital color difference signal, and a second digital color difference signal, detecting means for detecting whether the reproduced digital video signal is copy-protected in response to the reproduced copyright information, signal modifying means for modifying at least the digital luminance signal output from the video signal processing means so as to protect an analog video signal derived from the digital video signal from being copied when the digital video signal is detected as being copy-protected;

signal converting means for converting the modified digital luminance signal, the first digital color difference signal, and the second digital color difference signal into a first video output signal of an analog composite output format and a second video output signal of an output format other than said analog composite output format; and signal outputting means for separately outputting said first video output signal and said second video output signal.

2. The digital reproducing apparatus as set forth in claim 1, wherein said signal modifying means is operable to apply to the digital luminance signal a pulse that exceeds the level of the video signal or that varies in the range equivalent to a pedestal level.

3. The digital reproducing apparatus as set forth in claim 2, wherein said signal converting means includes means for generating a digital color signal from the first and second digital color difference signals and means for mixing the generated digital color signal and the digital luminance signal so as to generate a digital composite signal, and wherein said signal outputting means includes first digital-analog converting means for converting the digital color signal and the digital luminance signal into an analog color signal and an analog luminance signal, respectively, and outputting the converted analog signals, and second digital-analog converting means for converting the digital composite signal into the analog composite signal and outputting the converted analog composite signal.

4. The digital reproducing apparatus as set forth in claim 3, wherein said signal modifying means includes means for modifying the first digital color difference signal and for delaying the second digital color difference signal for a time period substantially equal to an inherent time delay in said means for modifying the first digital color difference signal.

5. The digital reproducing apparatus as set forth in claim 4, wherein said signal modifying means is operable to generate a color burst signal with an inverted phase only in a plurality of predetermined horizontal synchronous signal intervals and to add said color burst signal with inverted phase to the first digital color difference signal.

* * * * *